United States Patent
Bantke et al.

(10) Patent No.: US 11,677,679 B2
(45) Date of Patent: Jun. 13, 2023

(54) METHOD AND SYSTEM FOR MANAGING SUB-TENANTS IN A CLOUD COMPUTING ENVIRONMENT

(71) Applicant: SIEMENS AKTIENGESELLSCHAFT, Munich (DE)

(72) Inventors: Oliver Bantke, Erlangen (DE); Balazs Biro, Budapest (HU); Denes Andras Bisztray, Budapest (HU); Christoph Elsner, Erlangen (DE); Bernhard Gatzhammer, Pfaffenhofen a.d.Ilm (DE); Frank Hackländer, Stuttgart (DE); Dorottya Hanak, Gödöllö (HU); Ronny Hendrych, Nuremberg (DE); Matthias Herbort, Sulzbach-Rosenberg (DE); Balazs Jakab, Budapest (HU); Tobias Moser, Fürth (DE); Istvan Raska, Bekecs (HU); Sebastian Ries, Munich (DE); Janos Schmidt, Budapest (HU); Ulf Vesper, Adelsdorf (DE); Andreas Walz, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/970,714

(22) PCT Filed: Feb. 19, 2019

(86) PCT No.: PCT/EP2019/054090
§ 371 (c)(1),
(2) Date: Aug. 18, 2020

(87) PCT Pub. No.: WO2019/158774
PCT Pub. Date: Aug. 22, 2019

(65) Prior Publication Data
US 2020/0382442 A1    Dec. 3, 2020

(30) Foreign Application Priority Data

Feb. 19, 2018 (EP) .................................... 18157408
Jul. 2, 2018 (EP) .................................... 18181234
Dec. 19, 2018 (EP) .................................... 18214045

(51) Int. Cl.
*H04L 47/762* (2022.01)
*H04L 47/726* (2022.01)
(Continued)

(52) U.S. Cl.
CPC .......... *H04L 47/762* (2013.01); *H04L 47/726* (2013.01); *H04L 47/783* (2013.01); *H04L 63/0807* (2013.01); *H04L 67/148* (2013.01)

(58) Field of Classification Search
None
See application file for complete search history.

(56) References Cited

U.S. PATENT DOCUMENTS

| 9,774,586 | B1 * | 9/2017 | Roche | G06F 21/6218 |
| 2014/0013423 | A1 * | 1/2014 | Jain | G06F 21/31 |
| | | | | 726/19 |

(Continued)

FOREIGN PATENT DOCUMENTS

WO    2015108539 A1    7/2015

OTHER PUBLICATIONS

International Preliminary Report on Patentability for International Patent Application PCT/EP2019/054090 dated May 28, 2020.
(Continued)

*Primary Examiner* — Mohamed Ibrahim
(74) *Attorney, Agent, or Firm* — Lempia Summerfield Katz LLC (57) ABSTRACT

A method and a system for managing sub-tenants (in a cloud computing environment. In one embodiment, the method
(Continued)

includes receiving a request to access sub-set of data of an asset from the cloud computing system from a sub-tenant device associated with a sub-tenant of a tenant. The sub-tenant is associated with an asset. The request includes a sub-tenant identifier, a tenant identifier, and an asset identifier. The method includes determining whether the sub-tenant is authorized to access the requested sub-set of data of the asset using the sub-tenant identifier, the tenant identifier, and the asset identifier based on at least one role and associated permissions to access the requested sub-set data of the asset. If the sub-tenant is authorized to access the requested sub-set data of the asset, the method includes providing access to the requested sub-set data of the asset to the sub-tenant.

17 Claims, 6 Drawing Sheets

(51) Int. Cl.
*H04L 47/783* (2022.01)
*H04L 67/148* (2022.01)
*H04L 9/40* (2022.01)

(56) References Cited

U.S. PATENT DOCUMENTS

| | | | |
|---|---|---|---|
| 2014/0075501 A1* | 3/2014 | Srinivasan | H04L 63/104 726/1 |
| 2014/0173694 A1 | 6/2014 | Kranz | |
| 2014/0215590 A1* | 7/2014 | Brand | H04L 67/1097 726/6 |
| 2014/0330869 A1* | 11/2014 | Factor | G06F 21/6281 707/783 |
| 2016/0087960 A1* | 3/2016 | Pleau | H04L 63/104 726/7 |
| 2016/0337365 A1* | 11/2016 | Beiter | H04L 63/102 |
| 2019/0014120 A1* | 1/2019 | Drabant | G06F 9/4451 |

OTHER PUBLICATIONS

Tang, Bo, Qi Li, and Ravi Sandhu. "A multi-tenant RBAC model for collaborative cloud services." 2013 Eleventh Annual Conference on Privacy, Security and Trust. IEEE, 2013. pp. 229-238.

* cited by examiner

METHOD AND SYSTEM FOR MANAGING SUB-TENANTS IN A CLOUD COMPUTING ENVIRONMENT

CROSS REFERENCE TO RELATED APPLICATIONS

This present patent document is a § 371 nationalization of PCT Application Serial Number PCT/EP2019/054090 filed Feb. 19, 2019, designating the United States, which is hereby incorporated in its entirety by reference. This patent document also claims the benefit of EP18157408.8 filed on Feb. 19, 2018, EP18181234 filed on Jul. 2, 2018, and EP18214045.9 filed on Dec. 19, 2018 all of which are also hereby incorporated in their entirety by reference.

FIELD

Embodiments relate to the field of a cloud computing system and to a cloud computing system for managing sub-tenants in a cloud computing environment.

BACKGROUND

With advent of cloud computing technology, a large number of devices (also commonly known as 'assets') are connected to a cloud computing system via the Internet. The devices may be located in a remote facility connected to the cloud computing system. For example, the devices may be equipment, sensors, actuators, robots, machinery in an industrial set-up(s). The devices may be medical devices and equipment in a healthcare unit. The devices may be home appliances or office appliances in a residential/commercial establishment.

The cloud computing system may provide remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via graphical user interface (e.g., of web applications). The insights and alerts may provide controlling and maintaining the devices, leading to efficient and fail-safe operation of the devices. The cloud computing system may also provide modifying parameters associated with the devices and issues control commands via the graphical user interface based on the insights and alerts.

The cloud computing system may include a plurality of servers or processors (also known as 'cloud infrastructure'), that are geographically distributed, connected with each other via a network. A dedicated platform (hereinafter referred to as 'cloud computing platform') is installed on the servers/processors for providing above functionality as a service (hereinafter referred to as 'cloud service'). The cloud computing platform may include a plurality of software programs executed on one or more servers or processors of the cloud computing system to provide delivery of the requested service to the devices and its users (hereinafter referred as tenants). The software programs may be artifacts such as cloud applications, firmware, digital twin, device configuration, and so on. The artifacts are deployed on the cloud computing platform by a plurality of providers.

The providers may provision the artifacts to one or more tenants so that the tenants may access the cloud service. For example, the cloud service may provide the tenants to access raw or analyzed data associated with one or more assets. It may be possible that tenant may not be owner of an asset rather an original equipment manufacturer (OEM). In such a case, a plant operator may be owner of the asset and may like to have access the data associated his/her assets in the plant. Currently, sub-tenants like plant operators do not have access to data of his/her assets as the tenant (i.e., OEM) has subscribed to accessing the data of the assets. Consequently, the sub-tenants may not have secure access to data of his/her assets, thereby causing inconvenience to the sub-tenants.

In light of the above, there is a need to for a cloud computing system capable of managing sub-tenants of tenants.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a cloud computing environment configured to manage sub-tenants of tenants to access data associated with respective assets.

Embodiments provide a method of managing sub-tenants in a cloud computing environment. The method includes receiving a request to access sub-set of data of an asset from a cloud computing system from a sub-tenant device associated with a sub-tenant of a tenant. The sub-tenant is associated with an asset. The request includes a sub-tenant identifier, a tenant identifier, and an asset identifier. The method includes determining whether the sub-tenant is authorized to access the requested sub-set of data of the asset using the sub-tenant identifier, the tenant identifier, and the asset identifier based on at least one role and associated permissions to access the requested sub-set data of the asset. The method includes providing access to the requested sub-set data of the asset to the sub-tenant when the sub-tenant is authorized to access the requested sub-set data of the asset.

In an embodiment, the method includes rejecting the request to access the requested sub-set data of the asset when the sub-tenant is not authorized to access the requested sub-set data of asset, and sending a notification indicating that the sub-tenant is not authorized to access the requested sub-set data of the asset to the sub-tenant device.

In an embodiment, the method includes determining whether there exists an active session with the sub-tenant based on the sub-tenant identifier. The method includes establishing a session with the sub-tenant when there exists no active session with the sub-tenant.

In an embodiment, the method includes determining whether the tenant associated with the sub-tenant is authorized to access sub-set of data of the asset using the tenant identifier. If the tenant associated with the sub-tenant is authorized to access the requested sub-set of data of the asset, the method includes determining whether the sub-tenant is authorized to access the sub-set of data of the asset using the sub-tenant identifier.

In an embodiment, the method includes determining at least one role defined for the sub-tenant based on the sub-tenant identifier, and determining one or more permissions associated with the determined role. Furthermore, the method includes determining whether the sub-tenant is authorized to access the sub-set of asset data based on the determined role and permissions associated with the sub-tenant.

In an embodiment, the method includes generating an access token for providing access to the requested subset of asset data. The access token includes the role and the associated permissions granted for the sub-tenant, the sub-tenant identifier, and the sub-tenant identifier. The method includes providing access to the requested subset of asset data to the sub-tenant based on the access token. The access token is valid during the active session with the sub-tenant.

In an embodiment, the method includes retrieving the sub-set of asset data from a data store via appropriate application programming interface (API), and visualizing the retrieved sub-set of data of the asset on a sub-tenant device associated with the sub-tenant.

In an embodiment, the method includes creating a sub-tenant profile in a sub-tenant database. The sub-tenant profile includes the sub-tenant identifier, at least one tenant identifier, at least one asset identifier, at least one role and permissions granted by at least one tenant to access at least sub-set of asset data associated with the at least one asset identifier.

In an embodiment, the method includes updating the sub-tenant profile in a sub-tenant database.

In an embodiment, the method includes providing access to one or more sub-tenant profiles of sub-tenants to the associated tenant.

In an embodiment, the method includes receiving a request to update information associated with an asset from the sub-tenant device. The request includes the sub-tenant identifier, the asset identifier, and the information associated with the asset to be updated. The method includes updating the information associated with the asset in an associated asset model.

Embodiments include a system including one or more processing units, and one or more memory units accessible by the one or more processing units. The memory unit includes machine-readable instructions executable by the one or more processing units, that may cause the one or more processing units to perform method steps described above.

Embodiments include a computing environment including a system described above, and one or more sub-tenant devices communicatively coupled to the system.

Embodiments include a computer program product including machine-readable instructions stored therein, that when executed by one or more processing units, cause the one or more processing units to perform method steps described above.

DETAILED DESCRIPTION

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 1:
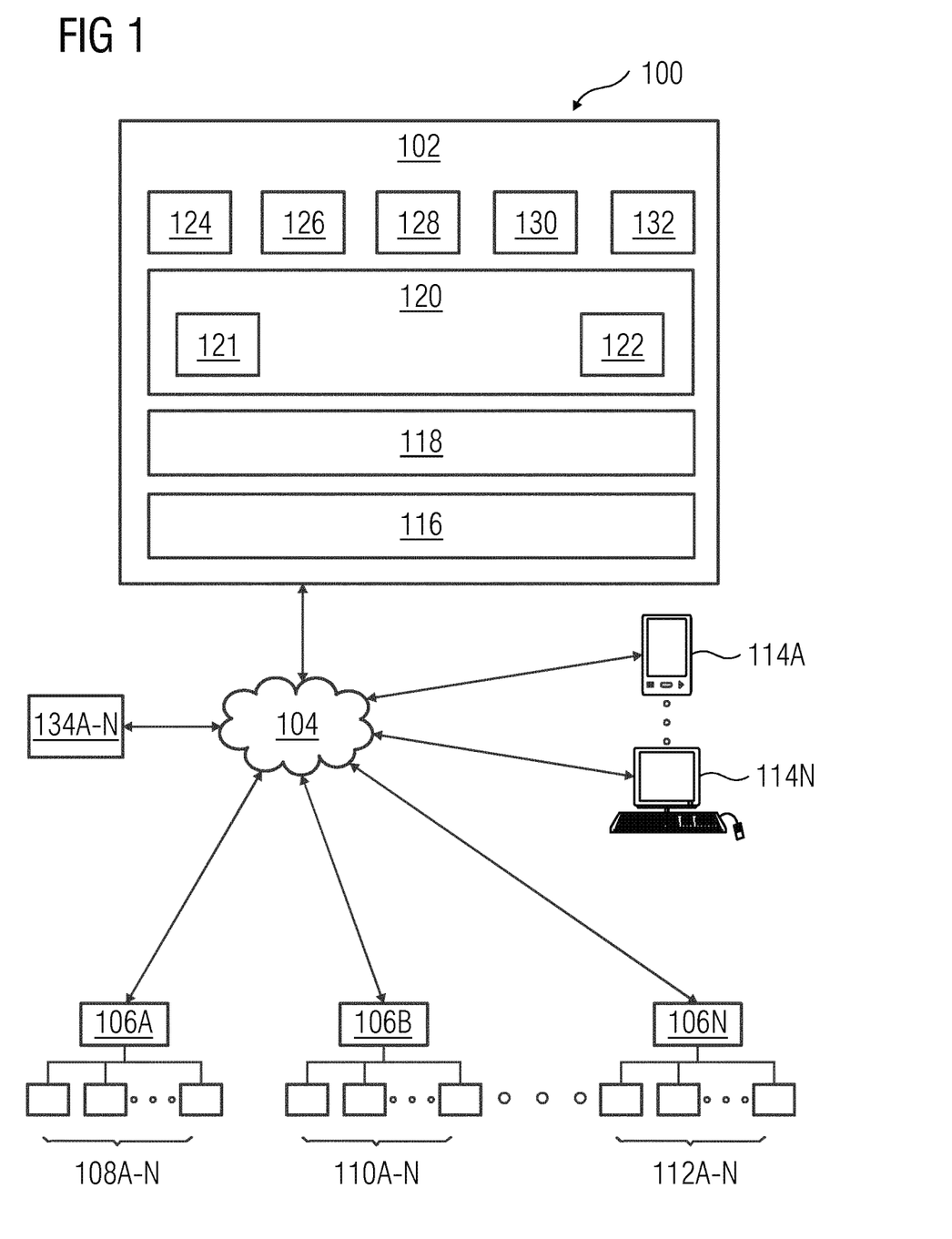
FIG. 1 is a schematic representation of a cloud computing environment, according to an embodiment.

FIG. 1 is a schematic representation of a cloud computing environment 100, according to an embodiment. FIG. 1 depicts the cloud computing system 102 configured to provide cloud services for managing assets 108A-N, 110A-N, and 112A-N. The cloud computing system 102 is connected to assets 108A-N, 110A-N, and 112A-N via a network 104 (e.g., Internet). The assets 108A-N, 110A-N, and 112A-N may be associated with sub-tenants 106A-N. The assets 108A-N, 110A-N, and 112A-N may include servers, robots, switches, automation devices, motors, valves, pumps, actuators, sensors, and other industrial equipment.

The cloud computing system 102 is also connected to sub-tenant devices 114A-N via the network 104. The sub-tenant devices 114A-N may access the cloud computing system 102 for accessing data of the assets 108A-N, 110A-N, and 112A-N (e.g., via visualization service). The sub-tenant devices 114A-N may be a laptop computer, desktop computer, tablet computer, smart-phone, and the like. The sub-tenant devices 114A-N may access cloud services (such as providing performance visualization of assets 108A-N, 110A-N, and 112A-N) via graphical user interfaces.

The cloud computing system 102 may be a public cloud, private cloud or a hybrid cloud configured to provide dedicated cloud services to its users. The cloud computing system 102 includes a network interface 116, hardware resources and OS 118, and a cloud computing platform 120. The network interface 116 provides communication between the cloud computing system 102 and the assets 108A-N, 110A-N, and 112A-N. Also, the network interface 116 provides communication between the cloud computing system 102 and the sub-tenant devices 114A-N.

The hardware resources and OS 118 may include one or more servers on which an operating system (OS) is installed. The servers may include one or more processing units, one or more storage devices (e.g., memory units) for storing data (e.g., data store 130, asset database 128, and sub-tenant database 132) and machine-readable instructions (e.g., applications 124 and application programming interfaces 126), and other peripherals required for providing cloud computing functionality.

The cloud platform 120 is a platform that provides functionalities such as data storage, data analysis, data visualization, data communication, etc. using the hardware resources and OS 118, and delivers the aforementioned cloud services using the application programming interfaces 126 deployed therein. The cloud platform 120 may include a combination of dedicated hardware and software built on top of the hardware and OS 118.

The cloud platform 120 includes a sub-tenant management module 121 that provides tenants 134A-N to manage sub-tenants 106A-N associated with the assets. The cloud computing platform 120 also includes an access control module 122 configured to provide secured access to data of assets 108A-N to the tenants 134A-N and the sub-tenants 106A-N.

Figure 2:
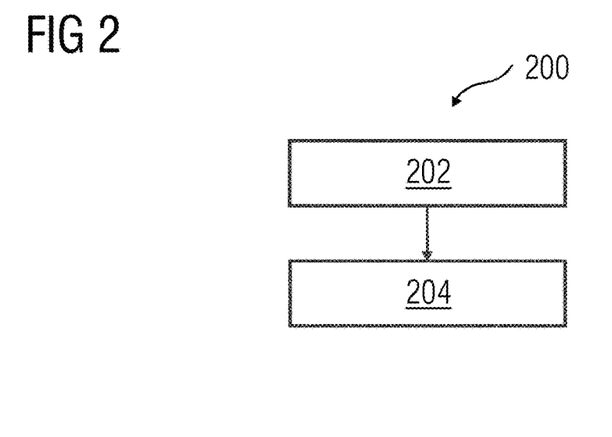
FIG. 2 is a process flowchart depicting a method of creating a sub-tenant profile of a sub-tenant by a tenant, according to an embodiment.

FIG. 2 is a process flowchart 200 depicting a method of creating a sub-tenant profile of a sub-tenant by a tenant, according to an embodiment. At step 202, a request to create a sub-tenant profile for a sub-tenant 106A is received from a tenant 134A. The tenant 134A is an original equipment manufacturer of an asset 108A. The tenant wishes to provide access to sub-set of data of the asset 108A to the sub-tenant 106A. The sub-tenant 106A is an operator of an industrial plant in which the asset 108A is operational. The request includes the sub-tenant identifier, tenant identifier, asset identifier, a role and permissions granted by the tenant 134A to access sub-set of asset data associated with the asset 108A. At step 204, a sub-tenant profile is created in the sub-tenant database 132. The sub-tenant management module 121 provides the tenant 134A to update the information in the sub-tenant profile. Also, the sub-tenant management module 121 provides the tenant 134A to delete the sub-tenant profile when the sub-tenant 106A is no more associated with the asset 108A. Additionally, the sub-tenant management module 121 provides access to one or more sub-tenant profiles of sub-tenants 106A-N to the associated tenant 134A.

Figure 3:
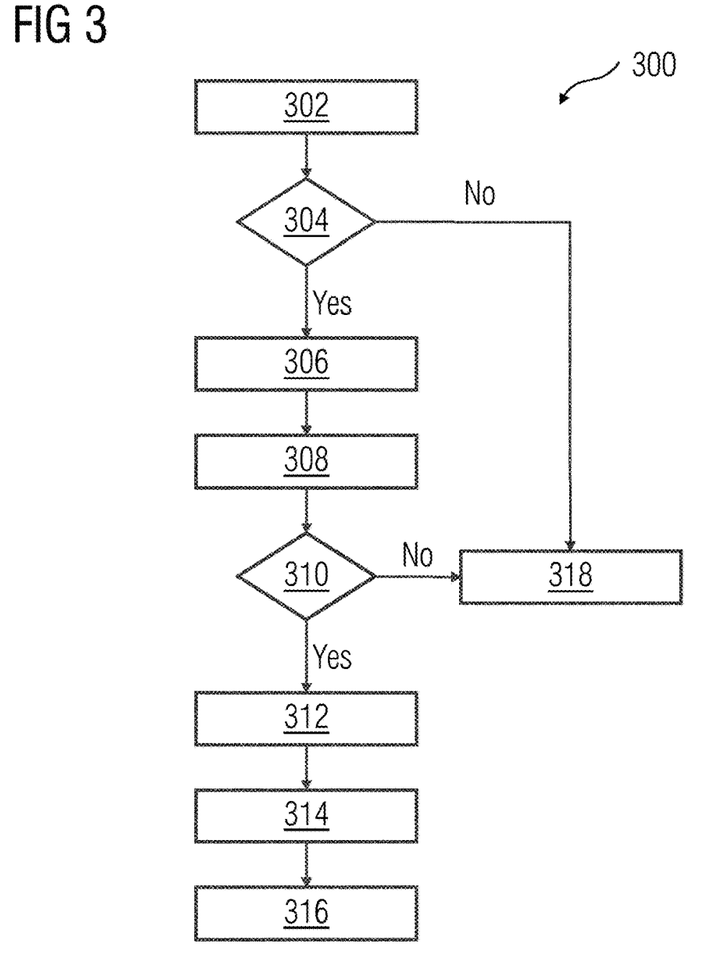
FIG. 3 is a process flowchart depicting a method of managing access to data of assets by authorized sub-tenants in a cloud computing environment, according to an embodiment.

FIG. 3 is a process flowchart 300 depicting a method of managing access to data of assets to authorized sub-tenants in a cloud computing environment 100, according to an embodiment. At step 302, a request to access a sub-set of data of an asset 108A from the cloud computing system 102 is received from a sub-tenant device 114A associated with a sub-tenant 106A of a tenant 134A. The sub-tenant is associated with the asset 108A. The request includes a sub-tenant identifier, a tenant identifier, and an asset identifier. At step 304, it is determined whether the tenant 134A associated with the sub-tenant 106A is authorized to access data of the asset 108A using the tenant identifier.

If the tenant 134A is not authorized to access the data of the asset 108A, then step 312 is performed. If the tenant 134A is authorized to access the data of the asset 108A, then at step 306, at least one role defined for the sub-tenant 106A for accessing the data of the asset 108A is determined based on the sub-tenant identifier. For example, the role may be admin role or standard role. At step 308, one or more permissions associated with the determined role are determined. For example, the permissions associated with the role may include read a pre-determined sub-set of data of the asset 108A, modify the location of the asset 108A, etc. At step 310, it is determined whether the sub-tenant 106A is authorized to access the sub-set of asset data based on the determined role and permissions associated with the sub-tenant 106A. If the sub-tenant 106A is not authorized to access the sub-set of the data of the asset 108A, then at step 312, the request to access the sub-set of asset data is rejected and a notification indicating the rejection is sent to the sub-tenant device 114A.

At step 314, an access token for providing access to the requested subset of asset data is generated. The access token includes the role and the associated permissions granted for the sub-tenant 106A, the sub-tenant identifier, and the sub-tenant identifier. At step 316, the sub-set of asset data is retrieved from a data store 130 by the application 124 via appropriate application programming interface (API) 126.

At step 318, the retrieved sub-set of data of the asset is visualized on a sub-tenant device 114A associated with the sub-tenant 106A.

Figure 4:
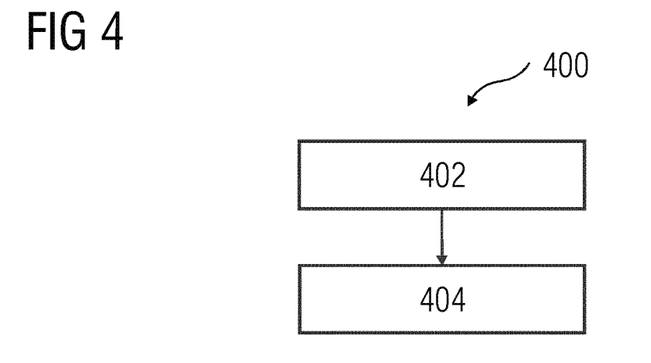
FIG. 4 is a process flowchart depicting a method of updating information of an asset by a sub-tenant, according to an embodiment.

FIG. 4 is a process flowchart 400 depicting a method of updating information of an asset 108A by the sub-tenant 106A, according to an embodiment. At step 402, a request to update information associated with the asset 108A from the sub-tenant device 114A of the sub-tenant 106A. The request includes the sub-tenant identifier, the asset identifier, and the information associated with the asset 108A to be updated. For example, the information of the asset 108A may be IP address, location information, etc. At step 404, the information associated with the asset 108A is updated in the associated asset database 128.

Figure 5:
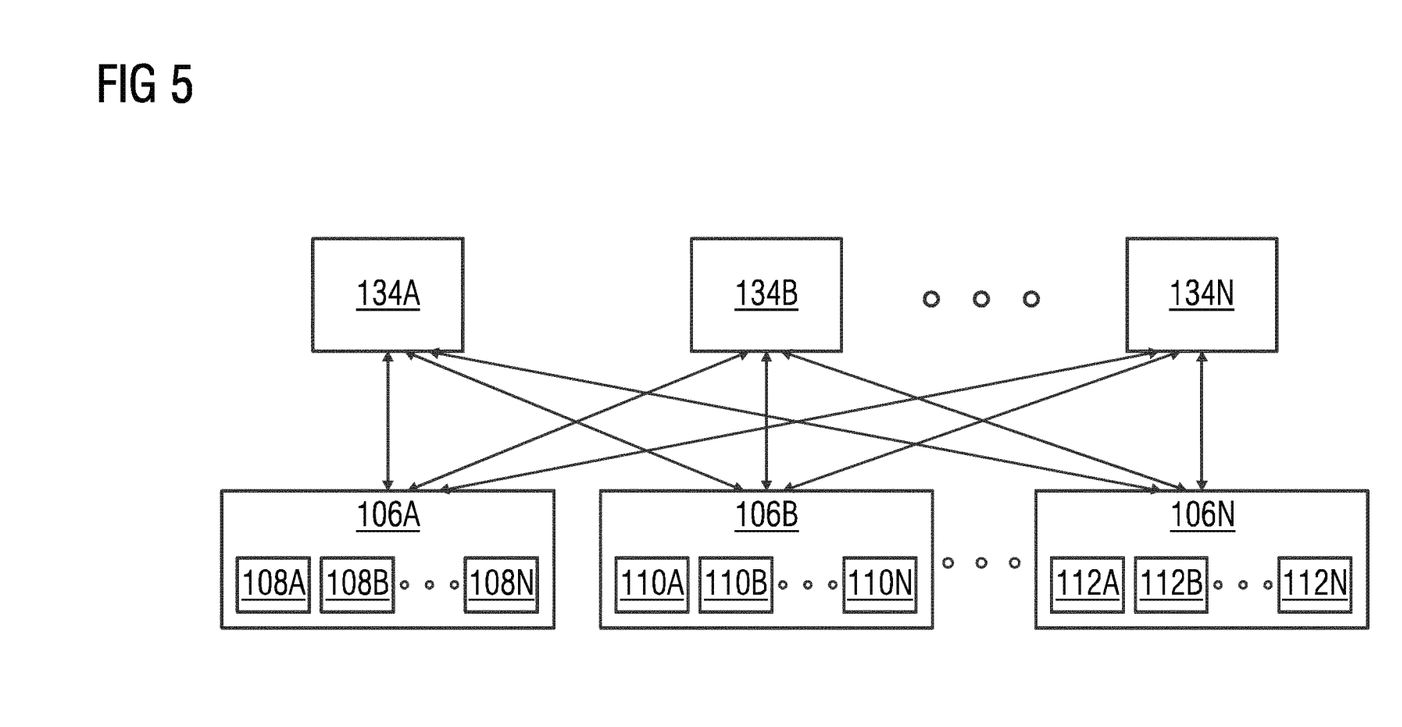
FIG. 5 is a schematic presentation of a relationship between tenants and sub-tenants for providing access to data of associated assets according to an embodiment.

FIG. 5 is a schematic presentation depicting relationships between tenants and sub-tenants for providing access to data of associated assets. As shown in FIG. 5, each tenant 134 may create sub-tenant profiles of the sub-tenants 106A-N that are responsible for managing assets 108A-N, 110A-N, and 112A-N respectively. For example, the tenant 134A may be OEM for the asset 108A, 110C and 112A. The tenant 134B may be OEM for the asset 108C, 110A, and 112C. The tenant 134C may be OEM for the asset 108B, 110B, and 112B. The sub-tenant 106A may be a plant operator having the assets 108A-N in his/her plant. The sub-tenant 106B may be a plant operator having the assets 110A-N in his/her plant. The sub-tenant 106C may be a plant operator having assets 112A-N in his/her plant. The tenants 134A-N may grant access to the sub-tenants 106A, 106B, and 106N to access respective data associated with the assets 108A-N, 110A-N, and 112A-N respectively using roles and permissions. Accordingly, the sub-tenants 106A-N may access respective data of associated assets 108A-N, 110A-N, and 112A-N based on assigned roles and permissions.

Figure 6:
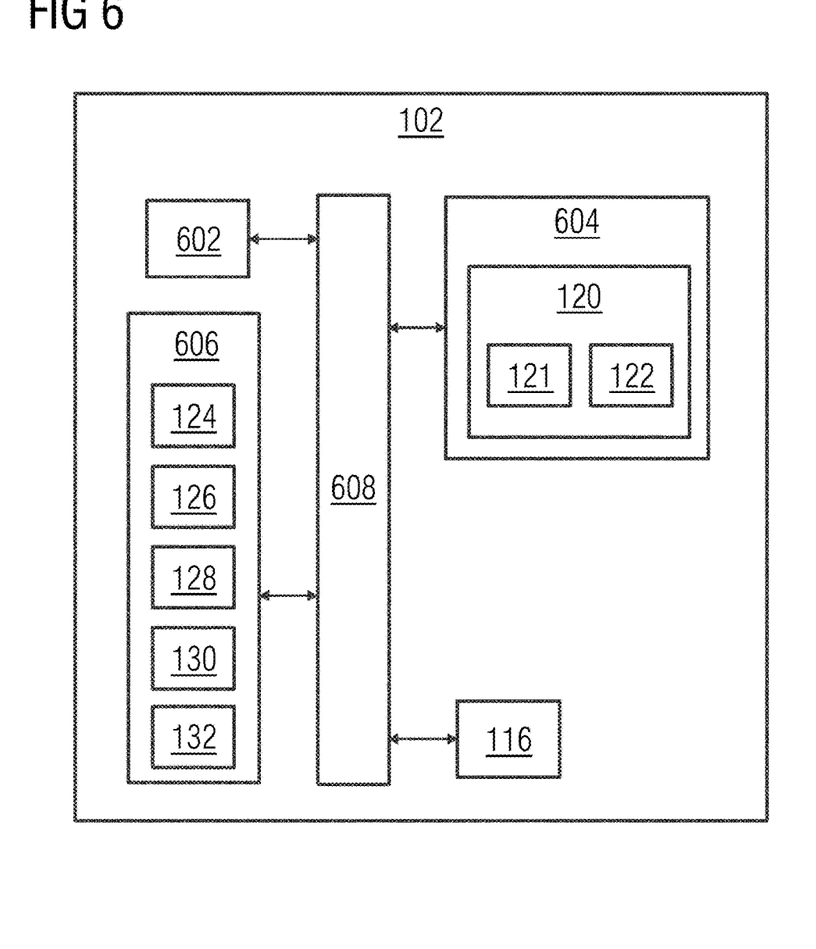
FIG. 6 depicts a block diagram of the cloud computing system, according to an embodiment.

FIG. 6 depicts a block diagram of the cloud computing system 102, according to an embodiment. The cloud computing system 102 includes processors 602, at least one accessible memory unit 604, a storage unit 606, a cloud interface 116, and an interface 608. The memory unit 604 includes a sub-tenant management module 121, and an access control module 122 stored in the form of machine-readable instructions and executable by the processor(s) 602. Alternatively, the sub-tenant management module 121, and the access control module 122 may take a form of hardware such as a processor with embedded software.

The processor(s) 602 may be one or more processing units (e.g., servers) configured to process requests from the tenant 106. The processor(s) 602 is also configured to execute machine-readable instructions stored on a computer-readable storage medium such as the memory unit 604 for performing various functions such as processing time-series data, analyzing time-series data, providing visualization of the analyzed time-series data, managing the tenants 134A-N, the sub-tenants 106A-N and the assets 108A-N, 110A-N, 112A-N (authentication, communication, upgradation, etc.) and so on.

The storage unit 606 may be volatile or non-volatile storage. In an embodiment, the storage unit 606 is configured to store artifacts 124, application programming interfaces (API) 126, an asset model database 128, a data store 130, a sub-tenant database 132. The artifacts may include cloud applications, software and firmware, asset models, and IoT data models, digital twins, visualization templates, big data analytics algorithms, application programming interfaces and so on.

The cloud interface 116 is configured to establish and maintain communication links with the assets 108A-N, 110A-N, and 112A-N including IoT edge devices. Also, the cloud interface 116 is configured to maintain a communication channel between the cloud computing platform 120 and the sub-tenant devices 114A-N. The interface 708 acts as interconnect between different components of the cloud computing system 102.

Figure 7:
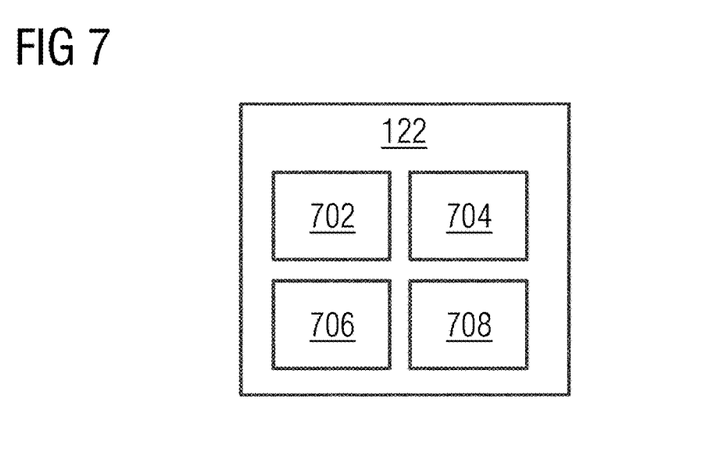
FIG. 7 depicts a block diagram of the access control module for managing access to a cloud service by authorized sub-tenant, according to an embodiment.

FIG. 7 depicts a block diagram of the access control module 122 for managing access to a cloud service by authorized sub-tenant, according to an embodiment. The access control module 122 includes a gateway module 702, an identity module 704, an authorization module 706, and an authentication module 708.

The gateway module 702 is configured to determine whether a valid session is established with a sub-tenant device (e.g., the device 114A) of a sub-tenant (e.g., sub-tenant 106A) to access the cloud service. The valid session indicates that the sub-tenant 106A is authenticated. The gateway module 702 is configured to determine whether the tenant associated with the sub-tenant 106A has valid subscription to access data of an asset 108A. The gateway module 702 is configured to retrieve an access token associated with the session if the session is valid and subscription is valid.

The identity module 704 is configured to determine roles and permissions assigned to the sub-tenant 106A by a tenant (e.g., a tenant 134A). The identity module 704 is configured to generate a response including the roles and permissions assigned to the sub-tenant 106A.

The authorization module 706 is configured to determine whether the roles and permissions assigned to the sub-tenant 106A matches with the request to access a subset of asset data. In other words, the authorization module 706 determines whether the sub-tenant 106A is authorized to access the requested sub-set of data based on the roles and permission assigned to the sub-tenant 106A. The authorization module 706 is configured to generate an access token including the roles and permissions of the sub-tenant 106A and the identifier associated with the cloud service if the sub-tenant 106A is authorized to access the requested sub-set of asset data.

The authentication module 708 is configured to perform initial authentication of a sub-tenant 106A based on valid credentials of the sub-tenant 106A for accessing the sub-set of asset data. For example, the valid credentials may be username and password combination or two factor authentication.

Figure 8:
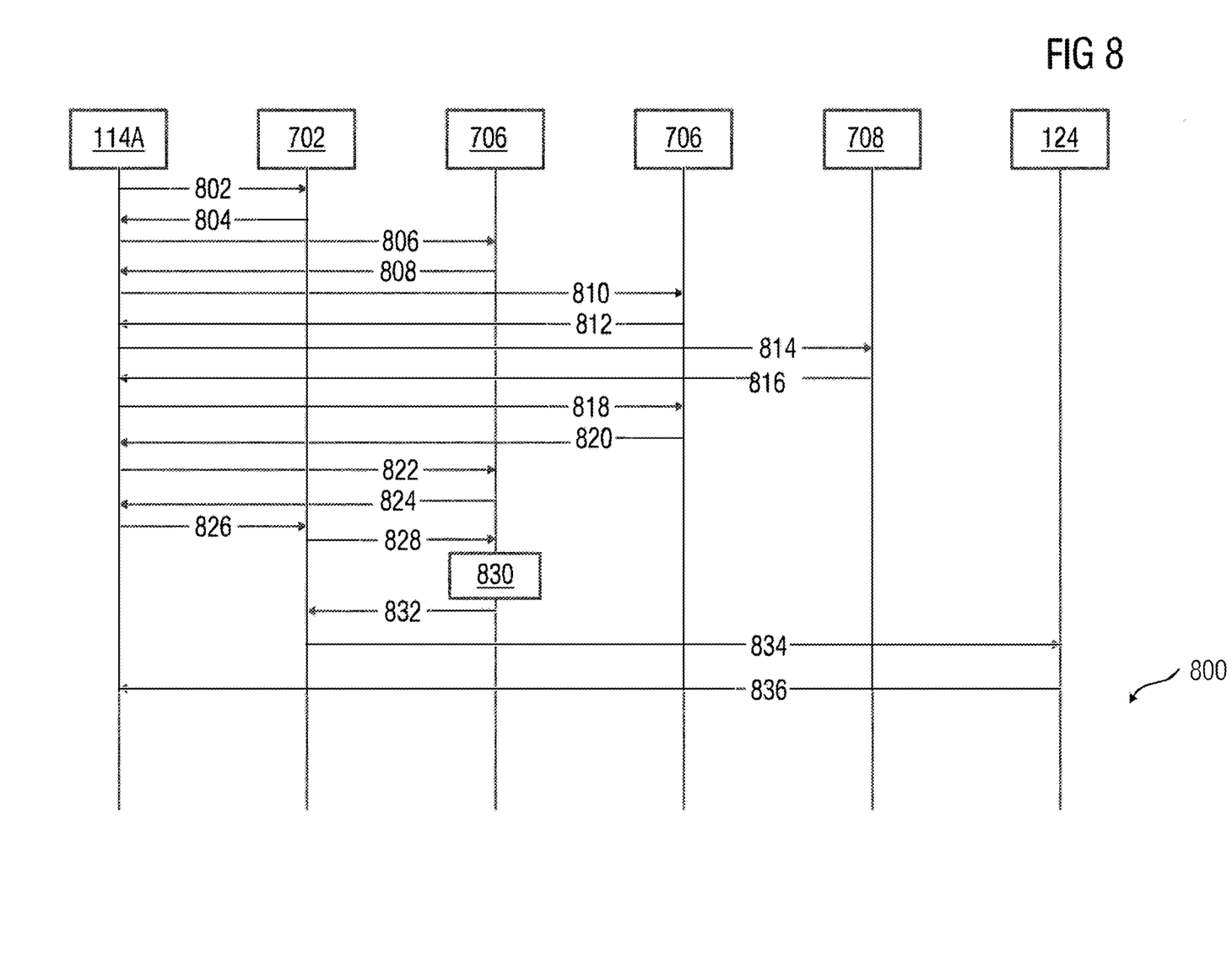
FIG. 8 is a flow diagram depicting a method of providing access to asset data to authorized sub-tenants, according to an embodiment.

FIG. 8 is a flow diagram 800 depicting a method of providing access to asset data to authorized sub-tenants, according to an embodiment. Consider that a sub-tenant 106A is trying to access a subset of asset data (e.g., data analytics and visualization) via an application 124 (e.g., visual analytics application) from a sub-tenant device 114A (e.g., using a web browser). For example, the data analytics and visualization service may provide the sub-tenant 106A monitoring performance of asset 108A in an industrial plant (e.g., condition monitoring of a motor). At step 802, the sub-tenant device 114A sends a request to provide access to the sub-set of asset data to the cloud computing system 102. The request includes a tenant identifier, a sub-tenant identifier, and an asset identifier of the asset 108A. At step 804, the gateway module 704 determines that there is no valid session with the sub-tenant device 114A and redirects the request back to the sub-tenant device 114A. At step 806, the sub-tenant device 114A redirects the request to the authorization module 706. At step 808, the authorization module 706 determines that there is no valid session with the sub-tenant device 114A and redirects the request back to the sub-tenant device 114A.

At step 810, the sub-tenant device 114A redirects the request to the identity module 704. At step 812, the identity module 704 determines that there is no valid session with the sub-tenant device 114A and redirects the request to the sub-tenant device 114A. At step 814, the sub-tenant device 114A redirects the request to the authentication module 708. At step 816, the authentication module 708 authenticates the sub-tenant 106A based on valid login credentials and sends an authentication response to the sub-tenant device 114A.

At step 818, the sub-tenant device 114A forwards the authentication response from the authentication module 708 to the identity module 704. At step 820, the identity module 704 determines a role and permissions assigned to the sub-tenant 106A to access the sub-set of data and sends a response with the assigned role and associated permissions to the sub-tenant device 114A.

At step 822, the sub-tenant device 114A sends the response with a role and permissions assigned to the sub-tenant 106A to the authorization module 706. At step 824, the authorization module 706 redirects the sub-tenant device 114A to an application callback endpoint. At step 826, the sub-tenant device 114A sends a request to the application callback endpoint to the gateway module 702. At step 828, the gateway module 702 sends a request to issue an access token for providing access to the sub-set of asset data to the sub-tenant device 114A. At step 830, the authorization module 706 generates an access token of the session with the sub-tenant device 114A. The access token defines role and permission granted to the sub-tenant 106A to access the sub-set of asset data via the application 124. The role and permissions are granted to the sub-tenant 106A (e.g., plant operator) are based on the role and permissions assigned to the sub-tenant 106A by the tenant 134A (e.g., Original Equipment Manufacturer (OEM)).

At step 832, the authorization module 706 sends the access token to the gateway module 702. Also, the authorization module 706 stores the access token so that the access token may be reused for authorizing the sub-tenant 106A to access the sub-set of asset data during the current session. This may save time and efforts to re-authenticate and re-authorize the sub-tenant 106A for providing access to the sub-set of asset data during the ongoing session.

At step 834, the gateway module 702 sends the access token associated with the sub-tenant 106A along with the request to access the sub-set of asset data to the application 124. At step 836, the application 124 provides access to the sub-set of asset data associated with the asset 108A to the sub-tenant device 114A based on the access token received from the gateway module 702.

Embodiments include a computer program product including program modules accessible from computer-usable or computer-readable medium storing program code for use by or in connection with one or more computers, processors, or instruction execution system. A computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification. While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of managing sub-tenants in a cloud computing environment, the method comprising:
   receiving a request to access sub-set of data of an asset from a cloud computing system from a sub-tenant device associated with a sub-tenant of a tenant, wherein the sub-tenant is associated with an asset, wherein the request comprises a sub-tenant identifier, a tenant identifier, and an asset identifier;
   determining that the tenant associated with the sub-tenant is authorized to access the sub-set of data of the asset using the tenant identifier;
   determining, after determining that the tenant is authorized, at least one role defined for the sub-tenant based on the sub-tenant identifier;
   determining one or more permissions associated with the at least one role;
   determining whether the sub-tenant is authorized to access the sub-set of asset data based on the determined role and permissions associated with the sub-tenant; and
   providing access to the requested sub-set data of the asset to the sub-tenant when the sub-tenant is authorized to access the requested sub-set data of the asset.

2. The method of claim 1, wherein providing access to the requested data of the asset to the sub-tenant comprises:
   generating an access token for providing access to the requested subset of asset data, wherein the access token comprises the role and the associated permissions granted for the sub-tenant, the sub-tenant identifier, and the asset identifier; and
   providing access to the requested subset of asset data to the sub-tenant based on the access token.

3. The method of claim 2, wherein providing access to the requested data of the asset based on the access token comprises:
   retrieving the sub-set of asset data from a data store via appropriate application programming interface; and
   visualizing the retrieved sub-set of data of the asset on the sub-tenant device associated with the sub-tenant.

4. The method of claim 3, wherein the access token is valid during the active session with the sub-tenant.

5. The method according to claim 1, further comprising:
   rejecting the request to access the requested sub-set data of the asset when the sub-tenant is not authorized to access the requested sub-set data of asset; and
   sending a notification indicating that the sub-tenant is not authorized to access the requested sub-set data of the asset to the sub-tenant device.

6. The method of claim 1, further comprising:
   determining whether there exists an active session with the sub-tenant based on the sub-tenant identifier; and
   establishing a session with the sub-tenant when there exists no active session with the sub-tenant.

7. The method of claim 1, further comprising:
   creating a sub-tenant profile in a sub-tenant database, wherein the sub-tenant profile comprises the sub-tenant identifier, at least one tenant identifier, at least one asset identifier, at least one role and permissions granted by at least one tenant to access at least sub-set of asset data associated with the at least one asset identifier.

8. The method of claim 1, further comprising:
   updating the sub-tenant profile in a sub-tenant database.

9. The method of claim 1, further comprising:
   providing access to one or more sub-tenant profiles of sub-tenants to the associated tenant.

10. The method of claim 1, further comprising:
    receiving a request to update information associated with the asset from the sub-tenant device, wherein the request comprises the sub-tenant identifier, the asset identifier, and the information associated with the asset to be updated; and
    updating the information associated with the asset in an associated asset model.

11. A system comprising:
    one or more processing units;
    one or more memory units accessible by the one or more processing units, wherein at least one memory unit comprises machine-readable instructions executable by the one or more processing units, that cause the one or more processing units to:
    receive a request to access sub-set of data of an asset from a cloud computing system from a sub-tenant device associated with a sub-tenant of a tenant, wherein the sub-tenant is associated with an asset, wherein the request comprises a sub-tenant identifier, a tenant identifier, and an asset identifier;
    determine whether the tenant associated with the sub-tenant is authorized to access sub-set of data of the asset using the tenant identifier;
    determine, after determining that the tenant is authorized, whether the sub-tenant is authorized to access the sub-set of data of the asset using the sub-tenant identifier; and
    provide access to the requested sub-set data of the asset to the sub-tenant when the sub-tenant is authorized to access the requested sub-set data of the asset.

12. The system of claim 11, wherein the instructions to determine whether the sub-tenant is authorized to access the sub-set of asset data comprise instructions that when executed by the one or more processing units, cause the one or more processing units to:
    determine at least one role defined for the sub-tenant based on the sub-tenant identifier;
    determine one or more permissions associated with the determined role; and
    determine whether the sub-tenant is authorized to access the sub-set of asset data based on the determined role and permissions associated with the sub-tenant.

13. The system of claim 12, wherein the instructions to provide access to the requested data of the asset to the sub-tenant comprise instructions that when executed by one or more processing units, cause the one or more processing units to:
  generate an access token for providing access to the requested subset of asset data, wherein the access token comprises the role and the associated permissions granted for the sub-tenant, the sub-tenant identifier, and the asset identifier; and
  provide access to the requested subset of asset data to the sub-tenant based on the access token.

14. The system of claim 11, further comprising one or more sub-tenant devices communicatively coupled to the system.

15. The system of claim 11, further comprising instructions that when executed by the one or more processing units, cause the one or more processing units to:
  reject the request to access the requested sub-set data of the asset when the sub-tenant is not authorized to access the requested sub-set data of asset; and
  send a notification indicating that the sub-tenant is not authorized to access the requested sub-set data of the asset to the sub-tenant device.

16. The system of claim 11, further comprising instructions that when executed by the one or more processing units, cause the one or more processing units to:
  determine whether there exists an active session with the sub-tenant based on the sub-tenant identifier; and
  establish a session with the sub-tenant when there exists no active session with the sub-tenant.

17. A non-transitory machine-readable medium including instructions stored therein, that when executed by one or more processing units, cause the one or more processing units to:
  receive a request to access a sub-set of data of an asset from a cloud computing system from a sub-tenant device associated with a sub-tenant of a tenant, wherein the sub-tenant is associated with an asset, wherein the request comprises a sub-tenant identifier, a tenant identifier, and an asset identifier;
  determine whether the tenant associated with the sub-tenant is authorized to access sub-set of data of the asset using the tenant identifier;
  determine, after determining that the tenant is authorized, whether the sub-tenant is authorized to access the sub-set of data of the asset using the sub-tenant identifier; and
  provide access to the requested sub-set data of the asset to the sub-tenant when the sub-tenant is authorized to access the requested sub-set data of the asset.

\* \* \* \* \*